Oct. 19, 1926. 1,603,460
E. HANCOCK
TAP OR VALVE FOR POTTER'S SLIP AND THE LIKE
Filed Dec. 1, 1925
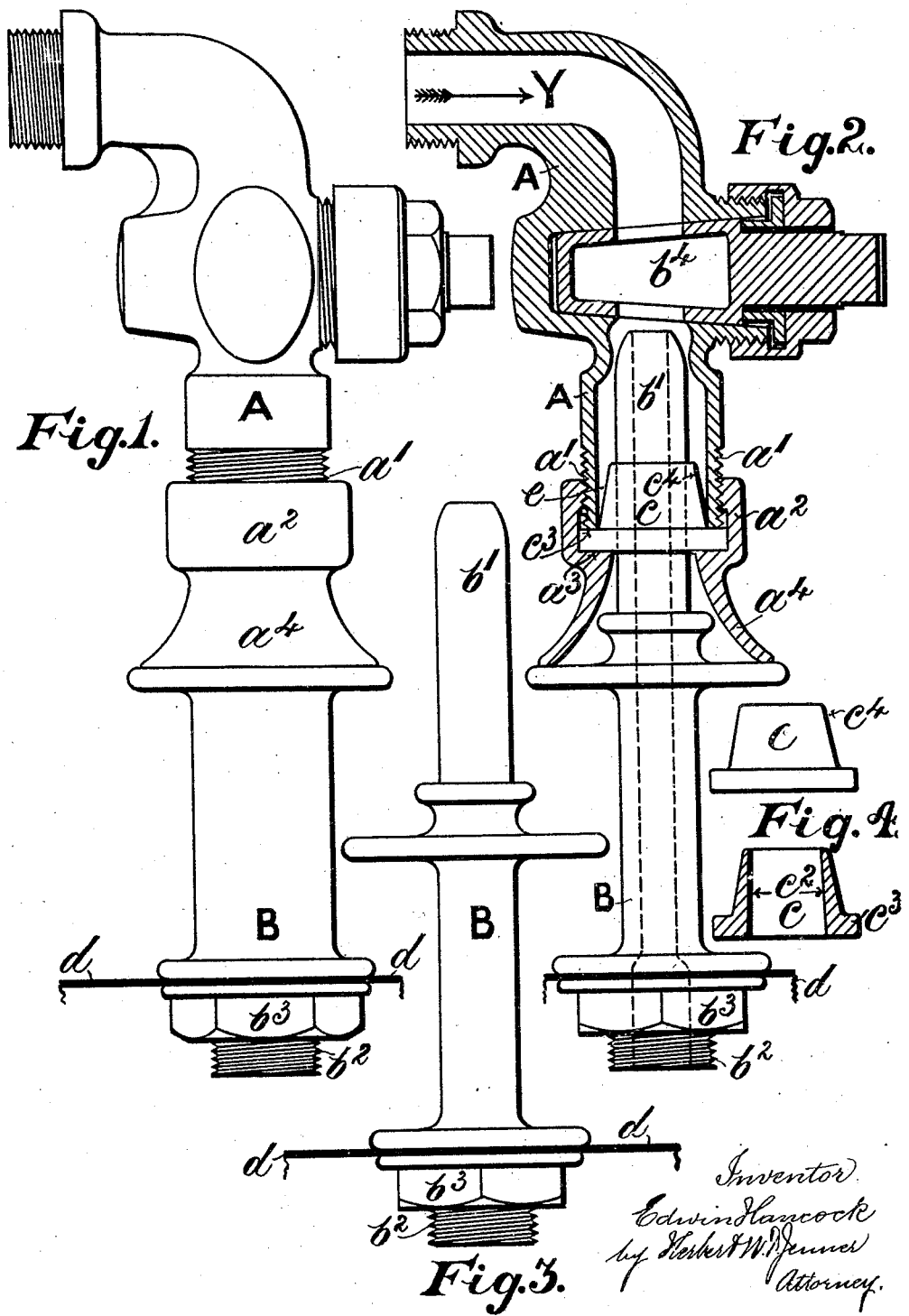

Patented Oct. 19, 1926.

1,603,460

UNITED STATES PATENT OFFICE.

EDWIN HANCOCK, OF HANLEY, STOKE-ON-TRENT, ENGLAND.

TAP OR VALVE FOR POTTERS' SLIP AND THE LIKE.

Application filed December 1, 1925, Serial No. 72,529, and in Great Britain December 3, 1924.

My invention relates to improvements in taps or valves for potters' slip and the like, the object being to provide improved means whereby the tap and its nozzle can be expeditiously connected and disconnected to form a perfectly liquid-tight joint without the employment of a box-nut, which necessitates the use of a spanner, or clamping device.

My invention consists essentially in the employment of an upwardly extending flexible sleeve or washer secured in the interior of the tap barrel or casing for the upper end of the nozzle to pass through and make contact therewith so that the downward pressure of the slip from the pump causes the flexible sleeve or washer to bind tightly round the nozzle and make a liquid-tight connection between the slip tap and nozzle.

My invention will be fully described with reference to the accompanying drawings.

*Description of the drawings.*

Fig. 1 is an elevation of a slip tap A and nozzle B with my invention applied thereto, Fig. 2 is a similar view to Fig. 1, partly in section, Fig. 3 is a side view of the nozzle B, and Fig. 4 is an elevation and section respectively of a rubber or composition sleeve or washer forming the essential feature of this invention.

In carrying out my said invention I construct the slip tap A to be secured to a main slip supply or stand pipe in the ordinary way. The lower end of the tap A is screw-threaded externally at $a^1$ to receive a sleeve $a^2$ having a shoulder $a^3$ on its inside to bind a rubber or composition sleeve or washer $c$ and securely fasten it against the lower end of the tap barrel A. The rubber or composition sleeve or washer $c$ (see Figs. 2 and 4) forms an essential feature of this invention as it is the means of making a close liquid-tight joint between the nozzle B and the tap A when the slip is passing into the press. The rubber or composition sleeve or washer $c$ is of a suitable height to take over a good surface of the upper end of the nozzle B, the hole $c^2$ in the india rubber or composition sleeve or washer being approximately equal in diameter to the end $b^1$ of the nozzle B which is tapered to enable it to easily pass through the hole in the flexible washer. The said rubber or composition sleeve or washer $c$ has a flange $c^3$ at its lower end and tapers upwardly so that the upper end of the sleeve or washer $c$ is of reduced thickness and very flexible to yield to the downward pressure of slip being forced by the pump.

The hole $c^2$ in the rubber or composition sleeve or washer $c$ is moulded of slightly conical formation, that is, it is of slightly greater diameter nearest the flange $c^3$ than at its upper end as shown at Fig. 4. This causes it to bind tightly round the upper end of the nozzle B when the tap A and nozzle B are pushed into engagement as shown at Fig. 2.

The nozzle B is constructed with a screwed lower end $b^2$ and provided with a nut $b^3$ to connect it to the press cloth $d$ in the usual well known way.

The rubber or composition sleeve or washer $c$ may be strengthened or stiffened at its lower end or flange $c^3$ where it is pinched between the end of the tap barrel A and the sleeve $a^2$. For example a layer of canvas or other suitable material (not shown) may be arranged on the flange $c^3$ to protect it and stiffen it at that point.

The sleeve $a^2$ at the lower end of the tap barrel A is splayed outwards at $a^4$ to facilitate the easy insertion of the end of the nozzle B.

To connect the tap A and nozzle B the upper tapered tubular end $b^1$ of the nozzle B is pushed through the hole $c^2$ in the rubber or composition sleeve or washer $c$ which makes very close contact therewith. When the tap valve $b^4$ is opened in the usual way the slip, forced by the pump in the direction of the arrow Y, passes through the tap A and tubular nozzle B to the press but as there is a chamber or space $e$ between the outside of the flexible washer $c$ and the tap barrel A the pressure of slip on the inclined surface $c^4$ of the flexible washer $c$ binds it tightly against the nozzle B and entirely prevents the escape of slip through the connection.

If found necessary the usual stand pipe, or main slip supply pipe may be controlled or fixed when the press is being charged with slip.

Slip taps constructed with my improved connections cannot possibly leak whilst the pump is working. There is a great saving of time in connecting and disconnecting the taps from their nozzles, and where the press trays are in bad condition and the nozzles out of alignment my new connections allow the slip taps to be readily connected to the nozzles and there is no leakage of slip during the filling of the filter press.

My improved slip tap has a liquid-tight connection made within the casing of the slip tap by means of an upwardly extending sleeve or washer which is forced upon the nozzle by the pressure of slip being forced therethrough by the pump. There is a continuous pressure of slip from the pump which is an important factor in this invention as by this means a perfectly liquid-tight joint is made between the interior of the tap and the nozzle all the time the bag is being filled with slip.

What I claim as my invention and desire to secure by Letters Patent is:—

A plug valve for delivering slip provided with a screwthreaded outlet tube which projects from its casing laterally of the plug, a tubular packing sleeve inserted in the outlet tube, and a clamping sleeve screwed on the outlet tube and provided with an internally projecting shoulder which clamps the packing sleeve against the end of the outlet tube, said clamping sleeve having also a conical portion which projects from the said shoulder and which forms a guide for the nozzle and a stop which prevents the end of the nozzle from striking the plug of the valve.

In testimony whereof I have hereunto set my hand.

EDWIN HANCOCK.